US011570103B2

(12) United States Patent
Sheu et al.

(10) Patent No.: US 11,570,103 B2
(45) Date of Patent: Jan. 31, 2023

(54) NETWORK COMMUNICATION DEVICE AND OPERATING METHOD FOR A NETWORK MAPPING TABLE

(71) Applicant: Realtek Semiconductor Corporation, Hsinchu (TW)

(72) Inventors: Jeong-Fa Sheu, Taoyuan (TW); Chia-Jui Yang, Taipei (TW); Jun-An Ding, Zhubei (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/024,937

(22) Filed: Sep. 18, 2020

(65) Prior Publication Data

US 2021/0266258 A1      Aug. 26, 2021

(30) Foreign Application Priority Data

Feb. 25, 2020   (TW) .................................. 109106103

(51) Int. Cl.
*H04L 45/745*   (2022.01)
*H04L 43/18*   (2022.01)
*H04L 69/22*   (2022.01)
*H04L 101/622*   (2022.01)

(52) U.S. Cl.
CPC ............ *H04L 45/745* (2013.01); *H04L 43/18* (2013.01); *H04L 69/22* (2013.01); *H04L 2101/622* (2022.05)

(58) Field of Classification Search
CPC ... H04L 45/745; H04L 43/18; H04L 61/6022; H04L 69/22
See application file for complete search history.

(56) References Cited

U.S. PATENT DOCUMENTS

| 9,559,909 B2 | 1/2017 | Roper |
| 2002/0009081 A1* | 1/2002 | Sampath ................. H04L 45/00 370/468 |
| 2002/0071422 A1* | 6/2002 | Amicangioli ......... H04L 67/561 707/E17.12 |

(Continued)

FOREIGN PATENT DOCUMENTS

| CN | 100586108 C | * | 1/2010 |
| CN | 100586108 C | | 1/2010 |
| TW | 201002119 A | | 1/2010 |

*Primary Examiner* — William G Trost, IV
*Assistant Examiner* — Monishwar Mohan
(74) *Attorney, Agent, or Firm* — Tim Tingkang Xia, Esq.; Locke Lord LLP (57) ABSTRACT

A network communication device includes a plurality of ports, a memory, and a processor. The plurality of ports is configured to receive a packet. A memory is configured to store a first lookup table and a second lookup table. An entry of the first lookup table includes a flag field. An entry of the second lookup table includes an entry address of the first lookup table. The processor is coupled to the memory and the plurality of ports. The network communication device is configured to: analyze the packet by a software or hardware to obtain a source Media Access Control (MAC) address; obtain, according to the source MAC address of the packet, the entry of the first lookup table; read the flag field of the entry; and determine, according to the flag field, whether the entry is referred by the second lookup table.

20 Claims, 4 Drawing Sheets

(56) References Cited

U.S. PATENT DOCUMENTS

| | | | | |
|---|---|---|---|---|
| 2003/0225881 | A1* | 12/2003 | Saxena | H04L 45/00 709/224 |
| 2007/0110068 | A1* | 5/2007 | Sekiguchi | H04L 69/12 370/392 |
| 2009/0274173 | A1* | 11/2009 | Wentink | H04L 69/22 370/474 |
| 2011/0292939 | A1* | 12/2011 | Subramaian | H04L 45/54 370/392 |
| 2014/0269729 | A1* | 9/2014 | Luo | H04L 45/745 370/392 |
| 2014/0313931 | A1* | 10/2014 | Roper | H04L 45/02 370/254 |

* cited by examiner

NETWORK COMMUNICATION DEVICE AND OPERATING METHOD FOR A NETWORK MAPPING TABLE

CROSS-REFERENCE TO RELATED APPLICATION

This application claims priority to and the benefit of Taiwan Application Serial Number 109106103, filed on Feb. 25, 2020, the entire content of which is incorporated herein by reference as if fully set forth below in its entirety and for all applicable purposes.

BACKGROUND

Field of Disclosure

The disclosure generally relates to network devices, and more particularly, to network communication devices for operating a network mapping table.

Description of Related Art

The address resolution protocol table is designed for recording the mapping relation between the network IP address and the MAC address. Usually, the 48-bit MAC address field of the address resolution protocol table and the MAC address field of layer 2 address lookup table share the field, such that the area of switches or routers is reduced. Generally, one field which points to the entry address of the layer 2 (L2) table is added, such that the circuit retrieves the MAC address, which associates with the ARP entry, in the L2 table. However, the MAC address which is stored in the L2 table may be altered by the source address learning process, such that the ARP lookup table directs to a wrong MAC address. Therefore, even though the switches or the routers can read the ARP lookup table to obtain the index of the L2 lookup table, the entry of the L2 lookup table may be altered such that the MAC address is wrong. Furthermore, if the corresponding entry is set as a static data row to prevent the data from being altered, the row data cannot be updated through the source MAC address learning process and the source port will not be updated. The mechanism of setting static data has a problem. When the host of the source MAC address is changed to a different connection port and the L2 lookup table connection port field is not updated, the corresponding port-number which is used to forward a packet is wrong.

Accordingly, the destination host cannot receive the packets for a while which are sent by the source host because of the wrong port information, and the efficiency of the switches or the routers is worse because it needs the software to modify the wrong data in the L2 table. Therefore, how to prevent the index from directing to wrong data is an urgent problem to be solved.

SUMMARY

The present disclosure of an embodiment provides a network communication device including a plurality of ports, a memory, and a processor. The plurality of ports is configured to receive a packet. A memory is configured to store a first lookup table and a second lookup table. The entry of the first lookup table includes a flag field, and the entry of the second lookup table includes an address field which points to an entry of the first lookup table. The processor is coupled to the memory and the plurality of ports. The network communication device is configured to: analyze the packet by a software or hardware to obtain a source Media Access Control (MAC) address; obtain, according to the source MAC address of the packet, an entry data of the first lookup table; read the flag field of the entry; and determine, according to the flag field, whether the entry is referred by the second lookup table.

One aspect of the present disclosure is to provide an operating method for a network mapping table configured for a network communication device. The network communication device is configured to store a first lookup table and a second lookup table. An entry of the first lookup table includes a flag field, and an entry of the second lookup table includes an address field which points to an entry of the first lookup table. The operating method for the network mapping table includes steps of: receiving a packet from a connection port; analyzing the packet to obtain a source Media Access Control (MAC) address; obtaining, according to the source MAC address of the packet, the entry of the first lookup table; reading the flag field of the entry; and determining, by a content of the flag field, whether the entry is referred by the second lookup table.

BRIEF DESCRIPTION OF THE DRAWINGS

The disclosure can be more fully understood by reading the following detailed description of the embodiments, with reference made to the accompanying drawings as described below. It should be noted that the features in the drawings are not necessarily to scale. The dimensions of the features may be arbitrarily increased or decreased for clarity of discussion.

DETAILED DESCRIPTION

Figure 1:
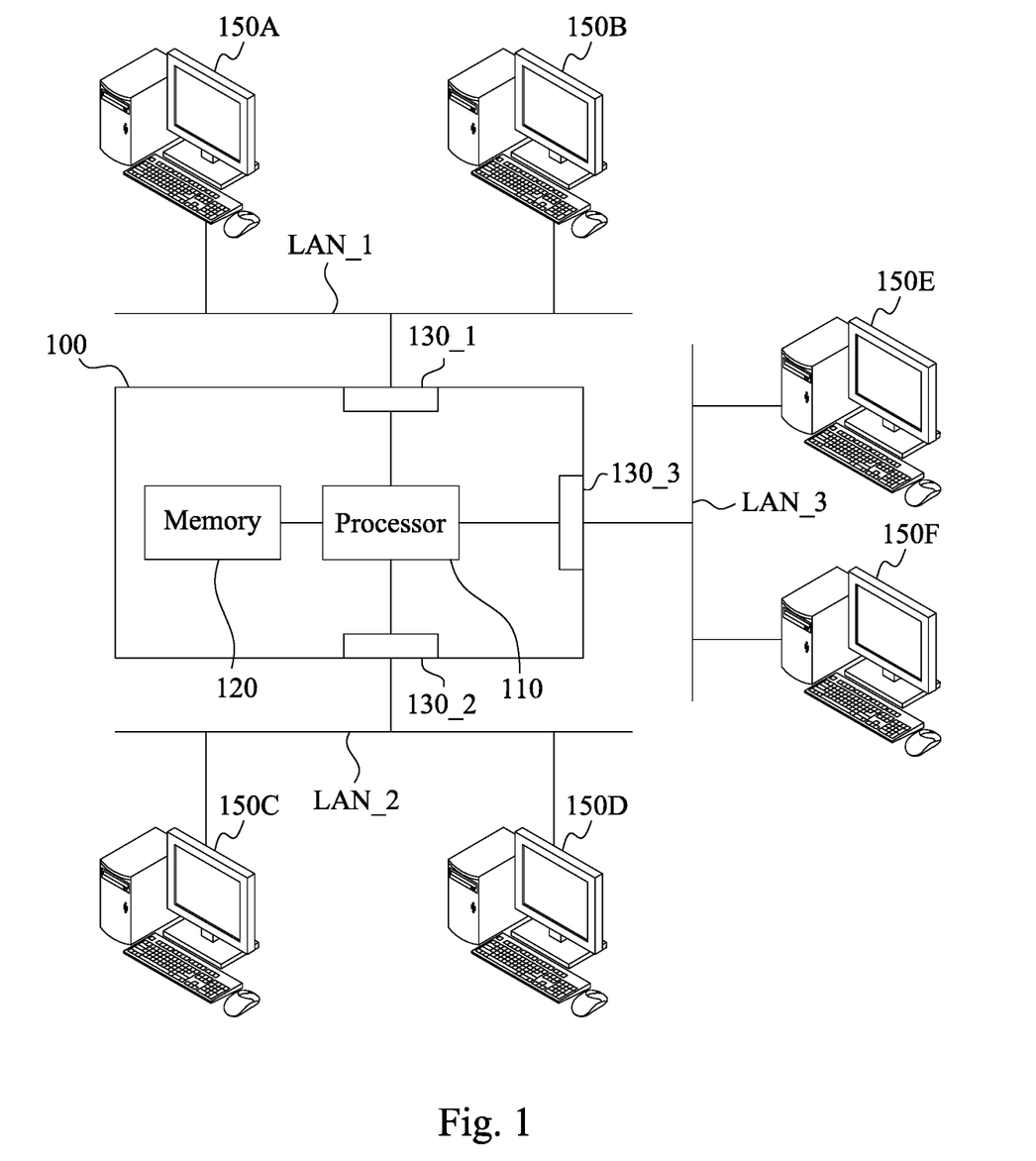
FIG. 1 is a network structure diagram that a network communication device and a plurality of network nodes transmit data with each other according to some embodiments of the present disclosure.

Reference is made to FIG. 1. FIG. 1 is a network structure diagram that a network communication device 100 and a plurality of network nodes transmit data with each other according to some embodiments of the present disclosure. The network nodes 150A-150F are provided as the embodiments and the connection topology is not limited to the network architecture in FIG. 1 herein. In some embodiments, the network communication device 100 is a Layer 2 switch or a Layer 3 router of the Open System Interconnection (OSI) Model.

As shown in FIG. 1, the network communication device 100 includes a processor 110, a memory 120, and a plurality of ports 130_1, 1302, and 130_3. The processor 110 is coupled to the memory 120 and a plurality of connection ports 130_1-130_3. Each of the network nodes 150A-150F connects to corresponding local area networks LAN_1-LAN_3 and forwards data through connection ports 130_1-130_3 of the network communication device 100.

In some embodiments, the network communication device 100 executes a lookup process. For example, as shown in FIG. 1, the network communication device 100 receives a packet of the network node 150A through the connection port 130_1 of the LAN_1 (assuming that the received packet is going to be forwarded to the network node 150E), and a destination IP (destination internet protocol, DIP) address of the packet is analyzed. If the network communication device 100 obtains, in mapping tables (including a first and a second lookup tables), a destination MAC address corresponding to the destination IP address and a connection port corresponding to the destination IP address (such as the connection port 130_3 of the LAN_3), the packet will be forwarded through the connection port 130_3 of the Layer 3 router to the network node 150E of the LAN_3.

In some embodiments, the network communication device 100 executes a learning process. For example, the network node 150A generates a packet and the packet is ready to be forwarded to the network node 150E. The network communication device 100 receives the packet through the connection port 130_1 and captures a source MAC address of the packet. If the network communication device 100 searches the L2 lookup table (or called a first lookup table) via the received source MAC address, a connection port field of the L2 lookup table will be updated by the source port number of the packet which the updating process depends on a configuration of the matched entry. If the network communication device 100 searches the L2 lookup table and cannot obtain the entry which matches the source MAC address, the network communication device 100 will automatically add a new entry to the L2 lookup table and write the source MAC address and the source port mapping data to the new entry. Furthermore, whether the source MAC address is found in the L2 lookup table or not, an age field is refleshed when the entry is updated or added as a new entry (the L2 lookup table is shown in TABLE I). Refleshing the age field represents that the entry is updated recently.

The memory 120 stores the first and the second lookup tables. The first lookup table is a mapping table configured to search which connection port that the packet should be forwarded in the Layer 2 switch. For example, the first lookup table is the L2 lookup table shown as TABLE I.

TABLE I the L2 lookup table

| Entry address | Static | Flag | Age | Port number | MAC address |
|---|---|---|---|---|---|
| i | 1 | 1 | 127 | port_1 | . . . |
| j | 1 | 0 | . . . | port_2 | . . . |
| k | 0 | 1 | . . . | port_3 | . . . |
| m | 0 | 0 | . . . | port_4 | . . . |

In TABLE I, the static field represents whether the entry is locked. In some embodiments, when the static is 1, the entry is locked, and the entry is called a static entry. When the static is 0, the entry is not locked, and the entry is called a dynamic entry. The static entry cannot be updated by the automatic learning process of the hardware. Only the dynamic entry can be updated by the automatic learning process of the hardware. The static entry can only be changed by the software which is executed by the processor. In some embodiments, the static field is optional and it is not a necessary parameter herein.

In TABLE I, the flag field represents whether the entry is referred by the ARP lookup table. The age field is applied for the dynamic entry and configured to represent whether the entry is valid. If the age of the entry is not reset in a period, the entry will become invalid. The port number is the connection port that the MAC address corresponds to. When the dynamic entry is referred by the ARP lookup table, the MAC address field of the dynamic entry is permanently valid and the age field of that entry is used for determining whether the port-number field of the dynamic entry is valid or not.

In the prior art, a static value and an age value of an L2 lookup table are used for determining whether the entire entry data is valid. The entry in the prior art includes multiple fields and the entire entry is either valid or invalid. In the disclosure, a flag field is applied in the entry data. The combinations of the static field, the age field, and the flag field are used to determine whether each of the MAC address field and the port-number field is valid.

In some embodiments, functions of the static field, the flag field, the age field, and the like are shown in TABLE II.

TABLE II

"X" is a "don't care" data

| Static | Flag | Age | MAC address field | Port-number field | Valid entry? | Description |
|---|---|---|---|---|---|---|
| 1 | 0 | X | Valid | Valid | Yes | The entry is not referred by the ARP lookup table and all fields of the row are permanently valid. |
| 1 | 1 | X | Valid | Valid | Yes | The entry is referred by the ARP lookup table. |
| 0 | 1 | > threshold | Valid | Valid | Yes | The entry is referred by the ARP lookup table. |
| 0 | 1 | <= threshold | Valid | Invalid | Yes | The entry is referred by the ARP lookup table. |
| 0 | 0 | > threshold | Valid | Valid | Yes | The entry is dynamic data. |
| 0 | 0 | <= threshold | Invalid | Invalid | No | The entry is invalid row data. |

In some embodiments, the packet is an IPv4 packet. The second lookup table is the APP table, and the network communication device 100 searches an L3 destination IP (DIP) address to obtain an L2 MAC address in the ARP lookup table. The ARP lookup table is shown in TABLE Ill.

TABLE III the ARP lookup table

| Valid | IP address (IPv4) | Entry address of L2 lookup table | Age |
|---|---|---|---|
| 1 | 180.2.6.1 | i | . . . |
| 1 | . . . | m | . . . |

In contrast to the ARP lookup table in the prior art which records the MAC address, the entry address field of the L2 lookup table in TABLE I in the disclosure does not record the MAC address. In some embodiment, the entry address is an address of the L2 lookup table, and the entry address represents which entry is linked with this DIP. For example, when the network communication device 100 obtains the destination IP address of the received packet, the network communication device 100 searches the entry corresponding to the IP address in the ARP lookup table shown as TABLE III. Hence, the network communication device 100 obtains the entry address of the L2 lookup table. Furthermore, the network communication device 100 reads the MAC address in TABLE I according to the entry address. In contrast to the ARP lookup table in the prior art which should record the MAC address and cost 48-bit memory space, the ARP lookup table in the disclosure only costs 10-bit memory space, for example, 1024 entries are stored in TABLE I. Accordingly, the cost of memory space is reduced.

Reference is made to TABLE I. The L2 lookup table includes a flag field. The flag is configured to tag whether the entry of the L2 lookup table is referred by the ARP lookup table. The flag affects the process of updating and searching the L2 lookup table.

Figure 2:
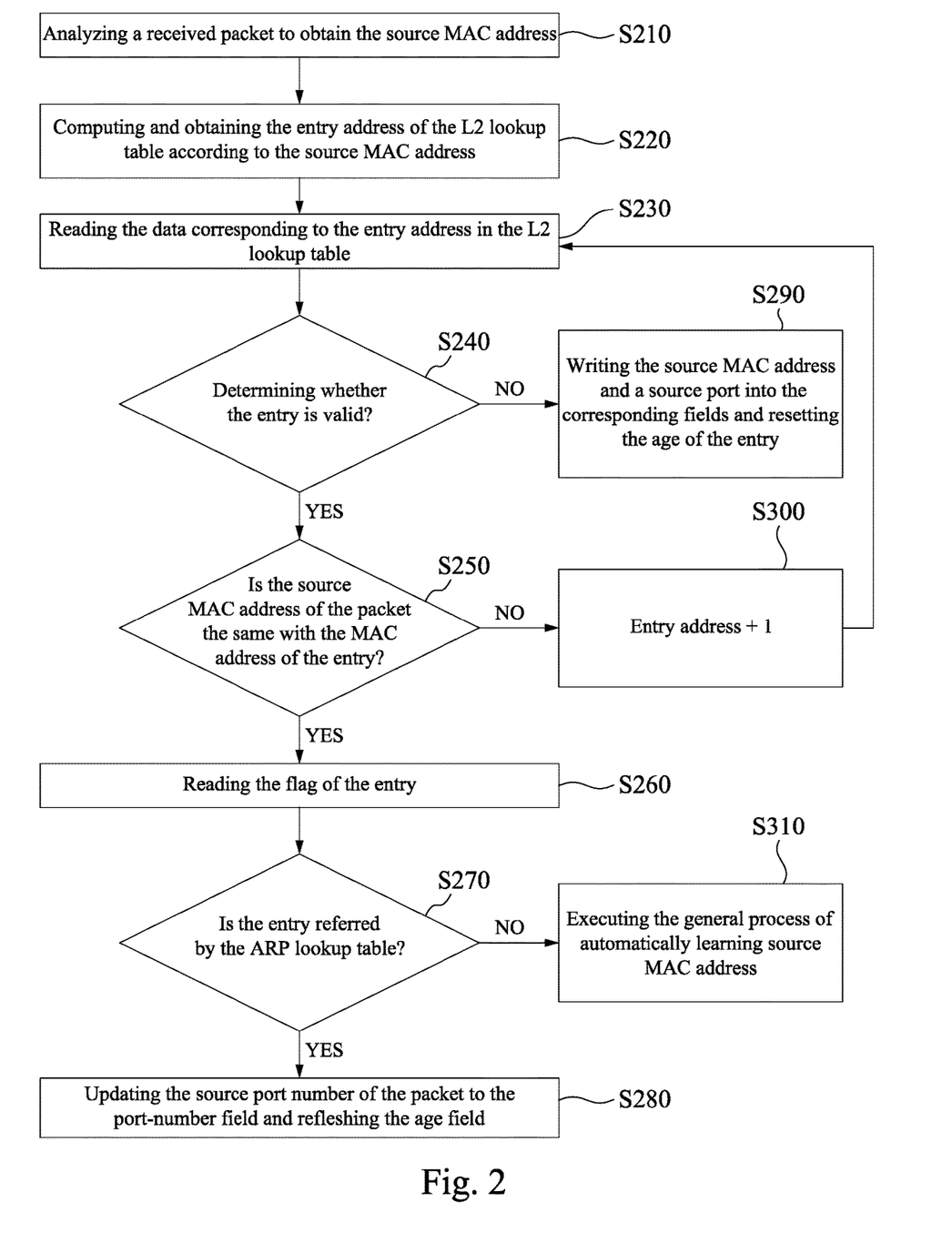
FIG. 2 is a flow chart illustrating learning and updating a source MAC address according to some embodiments of the present disclosure.

Reference is made to FIG. 2. FIG. 2 is a flow chart illustrating learning and updating a source MAC address according to some embodiments of the present disclosure. The network communication device 100 executes the process of learning and updating the source MAC address. The process of learning and updating the source MAC address is also called an operating method for the network mapping table.

In step S210, analyzing a received packet to obtain the source MAC address is performed.

In some embodiments, data of the packet includes the destination MAC address, the source MAC address, an IP header, a payload, and so on.

In step S220, computing and obtaining the entry address of the L2 lookup table according to the source MAC address of the received packet is performed.

In step S230, reading the data corresponding to the entry address in the L2 lookup table is performed.

In step S240, determining whether the entry is valid is performed.

In some embodiments, if the entry is invalid, in step S290 writing the source MAC address and a source port into the corresponding fields and resetting the age of the entry is performed. The process of learning the MAC address is finished.

In some embodiments, if the row is valid, in step S250 determining whether the source MAC address of the packet is the same with the value stored in the MAC address field of the entry is performed.

In some embodiments, if the source MAC address of the packet is different from the MAC address of the entry, in step S300 increasing the entry address is performed, and the flow chart goes to step S230 of reading the data of the next entry. In some other embodiments, if the source MAC address of the packet is different from the MAC address of the entry in step S250, steps of searching the address are finished and no next entry can be read, for example, the current row is the last row of the L2 lookup table.

In some embodiments, if the source MAC address of the packet is the same with the MAC address of the row data, in step S260 reading the flag of the entry is performed.

In some embodiments, the flag is 1-bit data.

In step S270, determining whether the entry is referred by the ARP lookup table is performed.

In some embodiments, when the flag is 1, the entry is referred by the ARP lookup table. When the flag is 0, the entry is not referred by the ARP lookup table.

In some embodiments, if the flag indicates that the entry is referred by the ARP lookup table, step S280 is performed.

In step S280, updating the source port number of the packet to the port-number field of the entry and reflashing the age field of the entry is performed.

In some embodiments, if the connection port of the network node which connects to the network communication device 100 is changed, the new port number which connects to the network communication device 100 can be automatically learned in step S280, and the new port number can be automatically updated in the L2 lookup table. Accordingly, when the next packet is received and its destination MAC address is the same with the MAC address in the L2 lookup table, the packet can be forwarded to the correct port number.

In some embodiments, if the entry is not referred by the ARP lookup table in step S270, step S310 is performed.

In step S310, executing the general process of automatically learning source MAC address in the L2 lookup table is performed and it is not described herein for the sake of conciseness.

Figure 3:
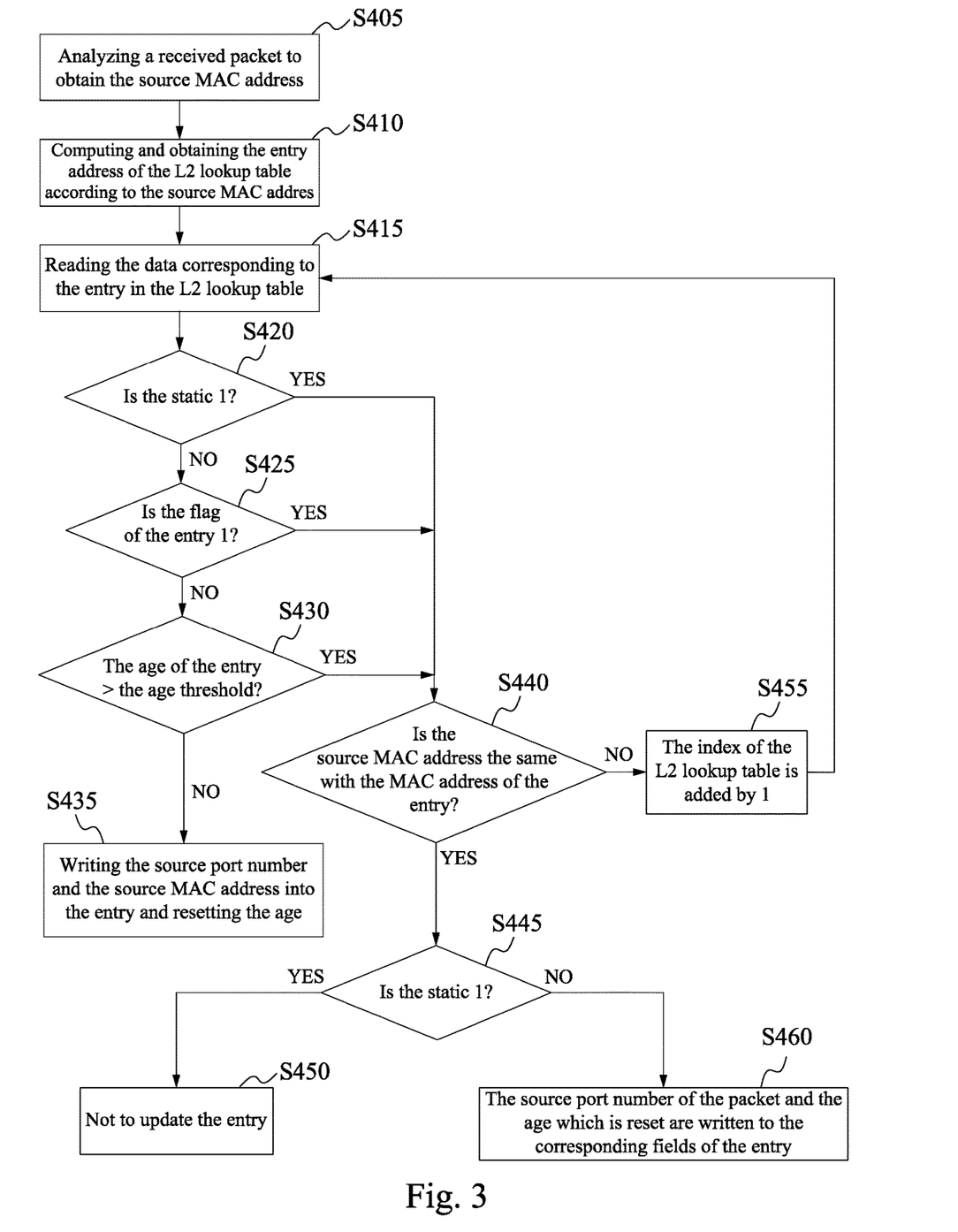
FIG. 3 is a flow chart illustrating learning and updating a source MAC address according to some embodiments of the present disclosure.

Reference is made to FIG. 3. FIG. 3 is a flow chart illustrating learning and updating a source MAC address according to some embodiments of the disclosure. FIG. 2 relates to determining, according to the flag, whether the entry of the L2 lookup table should be updated by the received packet. In FIG. 3, not only the flag is read, but also the static, the age, and the like of the L2 lookup table are taken into account. The method of learning and updating the source MAC address is also called an operating method for the network mapping table.

In step S405 and step S410, analyzing a received packet to obtain the source MAC address and computing and obtaining the entry address of the L2 lookup table according to the source MAC address of the received packet are performed.

In step S415, reading the data corresponding to the entry address in the L2 lookup table by the network communication device 100 is performed.

In some embodiments, the network communication device 100 reads the static field of the entry data.

In some embodiments, the static is 1-bit data. For example, when the static field of the $i^{th}$ entry is 1, the $i^{th}$ entry is locked by the software. Therefore, the circuitry of the network communication device 100 will not dynamically update the $i^{th}$ entry. When the static field of the $i^{th}$ entry is 0, the $i^{th}$ entry is not locked, and the circuitry of the network communication device 100 can update the $i^{th}$ entry based on the received packets.

In step S420, determining whether the static is 1 is performed.

In some embodiments, if the static is 1, the entry is locked, and step S440 is performed.

In some embodiments, if the static is not 1, the entry is not locked. In step S425, determining whether the flag of the entry is 1 is performed.

In some embodiments, if the flag is 1, the entry is referred by the ARP lookup table, and step S440 is performed.

In some embodiments, if the flag is not 1, the entry is not referred by the ARP lookup table, and step S430 is performed. In step S430, reading the age of the entry to determine whether the age is larger than an age threshold is performed.

In some embodiments, the age threshold is set as 0. If the age of the entry is smaller than or equal to the age threshold (e.g., 0), it means that the entry is aged-out and invalid, and step S435 is performed.

In step S435, writing the source port number of the packet and the source MAC address of the packet into the entry, and resetting the age is performed.

In some embodiments, if the destination MAC address of the packet is not stored in the L2 lookup table, the network communication device 100 will broadcast the packet to all connection ports of the destination interface which the packet belongs to (e.g., VLAN) in order to forward the packet to the destination host. If the network communication device 100 receives an acknowledgment packet (ack packet), the source MAC address of the ack packet and the source port number of the ack packet are learned to the L2 lookup table. When any next packet which has the same destination MAC address is sent to the network communication device 100, the network communication device 100 can search the same destination MAC address with the MAC address field in the L2 lookup table and then forward the packet to the correct connection port.

In step S430, if the age of the entry is larger than the threshold (e.g., 0), step S440 is performed.

In step S440, if the source MAC address of the packet is the same with the MAC address of the entry, step S445 is performed. In some embodiments, either the static or the flag of the entry is 1, or the age is larger than the threshold, any one of the two conditions determines whether the entry is valid.

In step S445, determining whether the static is 1 is performed.

In some embodiments, if the static is 1, step S450 is performed. In step S450, the entry should not be updated because the entry is locked. The learning process of the packet source MAC address is finished.

In some embodiments, if the static is 0, the source port number of the packet and the age which is reset are written into the corresponding fields of the entry in step S460.

In some embodiments, in step S440 if the source MAC address of the packet is different from the MAC address of the row data, step S455 is performed. When in step S440 the source MAC address of the packet is different from the MAC address of the entry, the current entry is occupied by other MAC addresses.

In step 455, the next entry address of the L2 lookup table is read and the flow chart goes to step S415 to read the next entry data. In some embodiments, the network communication device 100 stops reading the next entry, for example, the current entry is the last entry of the L2 lookup table, and stops searching in the L2 lookup table.

In some embodiments, if the data corresponding to the entry address is occupied by other MAC addresses, reading the next entry to compare the read entry with the received packet data is performed several times and is stopped while meeting the upper limit (e.g., 4 times). A person with ordinary skill in the art can design a practical number case by case and it is not described for the sake of conciseness.

It should be noted that the execution order in FIG. 3 in the disclosure is not limited to the order of steps S420~S430. In some embodiments, the order of steps in FIG. 3 can be changed as the order steps S425, S430, and S420. In other words, different combinations of steps also can be implemented to achieve the functions mentioned above.

In some embodiments, steps S420, S445, and S450 in FIG. 3 are optional steps. For example, if no static field is in the L2 lookup table, the static should be considered as 0 to perform the method. Accordingly, steps S420, S445, and S450 can be omitted.

Figure 4:
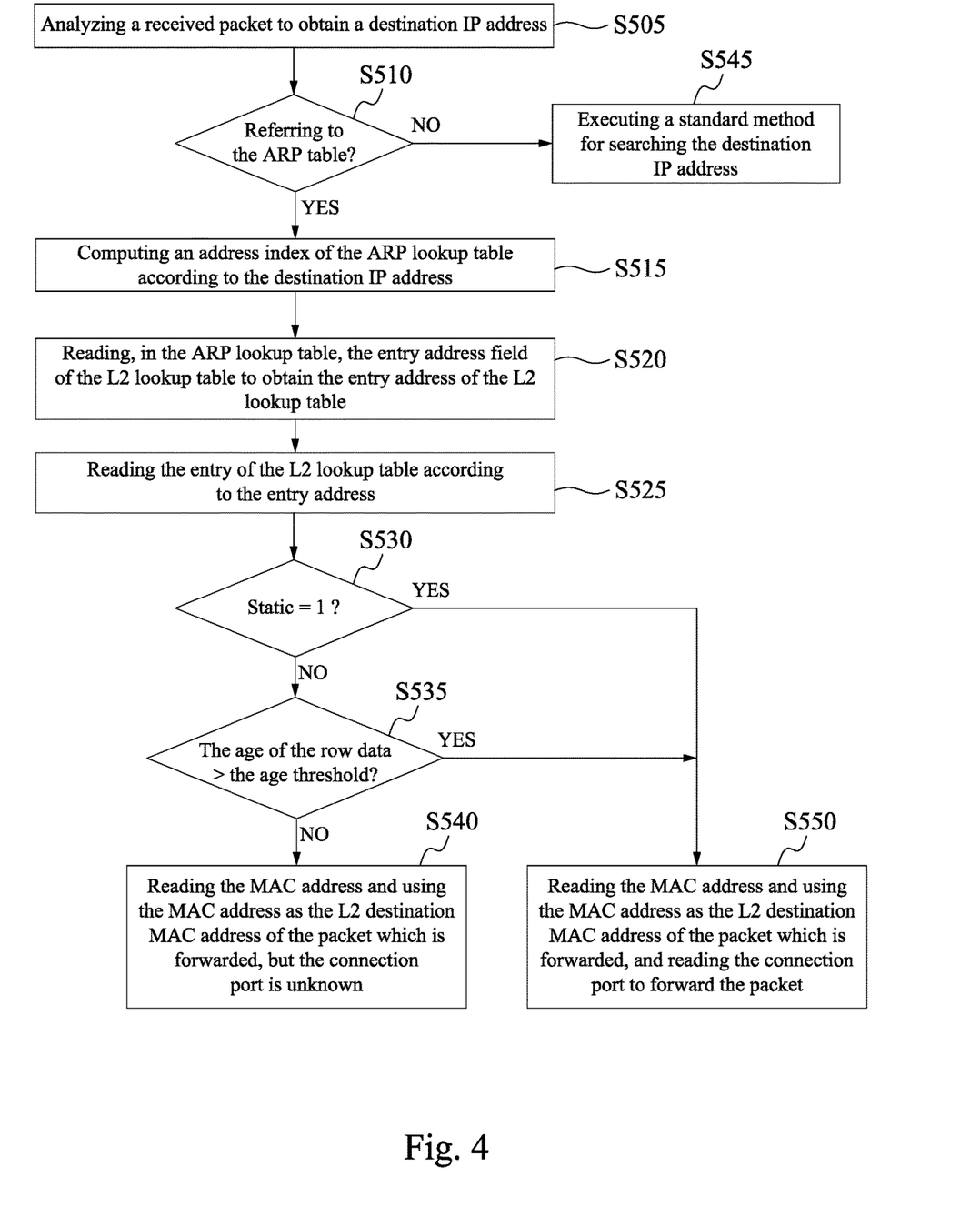
FIG. 4 is a flow chart illustrating searching a MAC address and a mapping port based on a destination IP of a packet according to some embodiments of the present disclosure.

Reference is made to FIG. 4. FIG. 4 is a flow chart illustrating searching a MAC address and a mapping port based on a destination IP of a packet according to some embodiments of the present disclosure. The method of searching the MAC address and the mapping ports is also called an operating method for the network mapping table.

In step S505, the network communication device 100 analyzes a received packet to obtain a destination IP address.

In step 3510, after the general IP packet searching process is performed, a determination of whether the ARP lookup table should be searched is made. A person with ordinary skill in the art knows how to implement step S510 and step 3510 is not described for the sake of conciseness. If there is no need for searching the ARP lookup table, step S545 is performed. If the ARP lookup table should be searched, step S515 is performed.

In step S545, executing a standard method for searching the destination IP address is performed.

In step S515, computing an address index of the ARP lookup table according to the destination IP address is performed. In some embodiments, the data of the entry pointed by the address index in the ARP lookup table is used for searching the L2 lookup table such as TABLE III.

In step 3520, reading, in the ARP lookup table, the entry address field of the L2 lookup table to obtain the entry address of the L2 lookup table is performed.

In step 3525, reading, in the L2 lookup table, the entry according to the entry address to obtain the static field and the age field is performed. Generally, the flag in the L2 lookup table represents that the MAC address field of the entry shares with the ARP lookup table, and the flag can be ignored. However, there is also a software configuration error such that the two tables do not match with each other.

In step 3530 and step 3535, when the static is equal to 1 (i.e., a static entry) or the age is larger than the age threshold, step 3550 is performed. In some embodiments, step 3550 is performed means that the connection port is valid. If the determinations of step 3530 and step 3535 are no, step S540 is performed.

In step 3550, reading the MAC address of the entry in the L2 lookup table and using the MAC address as the destination MAC address in the header of the layer 2 packet which is going to be forwarded, and using the connection port to forward the data is performed. The step of searching the destination IP is finished.

In step S540, reading the MAC address of the entry in the L2 lookup table and using the MAC address as the L2 destination MAC address of the packet which is forwarded is performed. Because the age is time out, the connection port field is invalid, and the correct connection port to forward the packet is unknown. Therefore, all the VLAN connection ports (usually multiple ports) which correspond to the same destination interface broadcast the packet.

In some embodiments, if one of the MAC addresses of the entry in the L2 lookup table is shared with the ARP lookup table, the static is 0 as a default value except the flag is 1. In other words, the entry is the dynamic entry so that the connection port of the entry can be automatically updated by the packet learning process. Accordingly, if the host changes its connection port, the network communication device 100 can still forward the packet to the correct port because the network communication device 100 will update the connection port immediately after receiving related acknowledge packets (in the prior art if the network communication device 100 does not update the connection port immediately, the host cannot receive the packet during a long time).

FIGS. 2-4 are the embodiments which are configured for the IPv4 packets. In some embodiments, the method for updating the network mapping table is also configured for the IPv6 packets.

In the IPv4 architecture, the network communication device 100 stores the ARP lookup table. In some embodiments, in the IPv6 architecture the network communication device 100 stores the neighbor discovery (ND) table (also called the second lookup table). The ND table stores the entry address of the L2 lookup table which corresponds to the entry of the L2 lookup table. Therefore, the memory 120 stores the L2 lookup table and the ND table such that the processes of FIGS. 2-4 can be performed.

Accordingly, the network communication device and operating method for updating the network mapping table solve the problem that when the prior art ARP lookup table (or the ND table) refers the index of the L2 lookup table, the ARP lookup table (or the ND table) retrieves the wrong MAC address in the situation that the data of the L2 lookup table is changed. Furthermore, if the age of the entry in the L2 lookup table is aged out, that is, the connection port field is invalid, the destination host in the prior art cannot receive the packet when the network communication device forwards the packet by referring the invalid connection port field. On the other hand, a 1-bit field, the flag field, is applied in the L2 lookup table in the disclosure, and the flag field is used to prevent the unlocked entry from being updated incorrectly. Furthermore, the 1-bit flag field is compatible with the current learning process of the L2 lookup table. Also, the flag can be implemented by the logic circuit of the hardware design without the intervention of the software or the system program to achieve the purpose by 1-bit memory space. Not only the small usage of the hardware circuit is implemented to reduce the circuitry area but also the small usage of the memory space is implemented. Therefore, the disclosure can achieve the advantages of saving the hardware cost and the memory space and immediately learning the changed connection ports to reduce the probability that the packet is forwarded to the wrong connection port.

What is claimed is:

1. A network communication device, comprising:
a plurality of ports configured to receive a packet;
a memory configured to store a first lookup table and a second lookup table, wherein an entry of the first lookup table comprises a flag field, an entry of the second lookup table comprises an entry address of the first lookup table, and the second lookup table does not include any entry for recording any of Media Access Control (MAC) addresses; and
a processor coupled to the memory and the plurality of ports, wherein the network communication device is configured to:
analyze the packet by a software or hardware to obtain a source Media Access Control (MAC) address;
obtain, according to the source MAC address of the packet, the entry of the first lookup table;
read the flag field of the entry; and
determine, according to the flag field, whether the entry of the first lookup table is referred by the second lookup table.

2. The network communication device of claim 1, wherein the entry of the first lookup table further comprises a MAC address field, and the MAC address field is configured for comparing with the source MAC address of the packet and is set to be a destination MAC address of a header of a second layer packet while forwarding the packet.

3. The network communication device of claim 2, wherein the entry of the first lookup table further comprises a port-number field and an age field, wherein the port-number field is configured to store a source port number of the packet and is configured as an outputting port-number while forwarding the packet, and the age field is configured to determine whether the entry is aged out.

4. The network communication device of claim 3, wherein the entry of the first lookup table further comprise a static field, wherein the static field is configured to determine whether the entry is locked; if the entry is locked, the entry is a permanently valid data and the entry will not be learned and updated by the hardware.

5. The network communication device of claim 4, wherein when the entry is valid, the MAC address field is the same with the source MAC address of the packet, and the entry is not locked, the source port number of the packet is updated to the port-number field of the entry, and when the port-number field is updated, the age field of the entry is reset.

6. The network communication device of claim 4, wherein when the MAC address field is different from the source MAC address of the packet, the flag field indicates that the entry is not referred by the second lookup table, and after the entry is determined to be an invalid entry, the source MAC address of the packet and the source port number of the packet are written into each corresponding field of the entry and the age field of the entry is reset.

7. The network communication device of claim 4, wherein the network communication device is configured to:
analyze the packet by the software or the hardware to obtain a destination IP address;
obtain, according to the destination IP address of the packet, the entry of the second lookup table;
obtain, according to the entry of the second lookup table, the entry address of the first lookup table; and
read, according to the entry address, the MAC address field of the entry of the first lookup table.

8. The network communication device of claim 7, wherein the MAC address field of the entry is a destination MAC address of a layer two protocol which the destination IP address of the packet corresponds to.

9. The network communication device of claim 8, wherein when the static field of the entry is a lock state, an output port for the packet is determined according to the port-number field.

10. The network communication device of claim 8, wherein when the static field of the entry is an unlock state and the age field of the entry is larger than an age threshold, the output port forwarding the packet is determined according to the port-number field; and when the static field of the entry is the unlock state and the age field of the entry is not larger than the age threshold, the packet is forwarded to all ports which belong to a destination interface.

11. An operating method for a network mapping table configured for a network communication device, the network communication device storing a first lookup table and a second lookup table, wherein an entry of the first lookup table comprises a flag field and an entry of the second lookup table comprises an entry address of the first lookup table, and the second lookup table does not include any entry for recording any of Media Access Control (MAC) addresses, the operating method for the network mapping table comprising:
receiving a packet from a connection port;

analyzing the packet to obtain a source Media Access Control (MAC) address;

obtaining, according to the source MAC address of the packet, the entry of the first lookup table;

reading the flag field of the entry; and determining, according to the flag field, whether the entry of the first lookup table is referred by the second lookup table.

12. The operating method for the network mapping table of claim 11, wherein the entry of the first lookup table further comprises a MAC address field, and the MAC address field is configured for comparing with the source MAC address of the packet and is set to be a destination MAC address of a header of a second layer packet while forwarding the packet.

13. The operating method for the network mapping table of claim 12, wherein the entry of the first lookup table further comprises a port-number field and an age field, wherein the port-number field is configured to store a source port number of the packet and is configured as an outputting port-number while forwarding the packet, and the age field is configured to determine whether the entry is aged out.

14. The operating method for the network mapping table of claim 13, wherein the entry of the first lookup table further comprise a static field, wherein the static field is configured to determine whether the entry is locked; if the entry is locked, the entry is a permanently valid data and the entry will not be learned and updated by the hardware.

15. The operating method for the network mapping table of claim 14, wherein when the entry is valid, the MAC address field is the same with the source MAC address of the packet, and the entry is not locked, the source port number of the packet is updated to the port-number field of the entry, and when the port-number field is updated, the age field of the entry is reset.

16. The operating method for the network mapping table of claim 14, wherein when the MAC address field is different from the source MAC address of the packet, the flag field indicates that the entry is not referred by the second lookup table, and after the entry is determined to be an invalid entry, the source MAC address of the packet and the source port number of the packet are written into each corresponding field of the entry and the age field of the entry is reset.

17. The operating method for the network mapping table of claim 14, further comprising:

analyzing the packet by the software or the hardware to obtain a destination IP address;

obtaining, according to the destination IP address of the packet, the entry of the second lookup table;

obtaining, according to the entry of the second lookup table, the entry address of the first lookup table; and reading, according to the entry address, the MAC address field of the entry of the first lookup table.

18. The operating method for the network mapping table of claim 17, wherein the MAC address field of the entry is a destination MAC address of a layer two protocol which the destination IP address of the packet corresponds to.

19. The operating method for the network mapping table of claim 18, wherein when the static field of the entry is a lock state, an output port for the packet is determined according to the port-number field.

20. The operating method for the network mapping table of claim 18, wherein when the static field of the entry is an unlock state and the age field of the entry is larger than an age threshold, the output port forwarding the packet is determined according to the port-number field; and when the static field of the-entry is the unlock state and the age field of the entry is not larger than the age threshold, the packet is forwarded to all ports which belong to a destination interface.

* * * * *